March 21, 1961 D. RICHMAN 2,976,350

CONTROL APPARATUS FOR COLOR SYNCHRONIZATION IN COLOR TELEVISION

Filed June 20, 1958 2 Sheets-Sheet 1

March 21, 1961

D. RICHMAN 2,976,350

CONTROL APPARATUS FOR COLOR SYNCHRONIZATION IN COLOR TELEVISION

Filed June 20, 1958

2 Sheets-Sheet 2

United States Patent Office 2,976,350
Patented Mar. 21, 1961

2,976,350

CONTROL APPARATUS FOR COLOR SYNCHRONIZATION IN COLOR TELEVISION

Donald Richman, Fresh Meadows, N.Y., assignor to Hazeltine Research, Inc., Chicago, Ill., a corporation of Illinois Filed June 20, 1958, Ser. No. 743,396
12 Claims. (Cl. 178—5.4)

*General*

This invention relates to control apparatus and, more particularly, to apparatus for controlling the automatic color-synchronization systems of compatible color-television receivers.

Compatible color-television receivers are subject to difficulties arising from the more stringent transmitter signal tolerances which create a problem by allowing a relatively narrow range of burst gate interval locations within the synchronizing interval. The tolerances concerned are described in Appendix III of the Federal Communications Commission Order of December 17, 1953, Figs. 4(*a*) and 4(*b*). It should be noted that there are two sets of tolerances given; one for monochrome transmission and the other for color transmission. Prior known burst gating systems, relying on flyback pulses to provide the gating interval, lack the advantage of accurately choosing at least the major portion of the burst gate interval to the exclusion of other signals, including, for example, chrominance components at the beginning of the video interval. The flyback pulse is comparable to the synchronizing or blanking interval in width and has a shape on top which varies from receiver to receiver and requires conventional accounting for by integration. This results in a time delay which causes the gate to be timed late enough to overlap and pass the initial chrominance components. This suggests that a direct burst gate derived from the trailing edge of the line-synchronizing pulse would be desirable. In broader terms, it becomes desirable to provide apparatus for accurately gating only a major portion of the burst interval.

Further problems are occasioned by spurious high-frequency signals developed during the retrace intervals and at the start of the trace intervals of the line-scanning wave. Insofar as applicant is aware, these difficulties were not understood prior to applicant's invention. During the reception of monochrome television signals the relatively narrow pass-band characteristic of many color-television receivers usually produces undesirable high-frequency components or transients when the receiver is mistuned. These spurious transients may appear as overshoots or undershoots at the leading or trailing edge portions of the pedestals and the line-synchronizing pulses (as represented by the broken-line construction in Fig. 2 of the drawings). While these transients may not affect the quality of the monochrome television image and may afford some degree of enhanced sharpness, they may cause the ringing of some circuits and produce high-frequency oscillations, termed widgets (see the two waves represented in the lower portion of Fig. 2), resembling color-burst synchronizing information, and these widgets may have sufficient amplitude that they undesirably actuate certain of the color circuits of the color-television receiver and render conductive the chrominance channel thereof. The additional noise supplied by the chrominance channel during monochrome reception impairs the quality of the reproduced image.

During the reception of a color-television signal widgets may undesirably be translated to the color-synchronization system which in one form includes a first phase detector that is intended to compare the phase of the reference or color-burst oscillations with that of a 3.58 megacycle quadrature-phase signal from the color-reference oscillator for the purpose of developing a correcting signal which is effective to adjust the phase of the signal of the color-reference oscillator to its proper value. Unfortunately, however, color-synchronization circuits recurrently respond to the widgets which, in effect, constitute false color-burst information, and, in the example given, the phase detector compares the phase of the widgets with that of the 3.58 megacycle oscillations to develop an erroneous correction signal. Color-synchronization systems may further include a second detector which may be a phase detector comparing the phase of the color-burst information with that of the color-reference oscillator to develop a unidirectional switching signal that is effective to control the operation of the color translating circuits during intervals when the receiver is pulling into synchronism with a color transmission, and that also is effective to disable the unneeded chrominance channel for monochrome reception. In some receivers, an envelope detector is used to control the chrominance channel. In any case, the circuits may respond undesirably to the spurious signals.

It is an object of the invention, therefore, to provide for use with color-synchronizing systems of compatible color-television receivers a new and improved control apparatus which avoids one or more of the above-mentioned disadvantages.

It is another object of the present invention to provide for use with an automatic color-synchronizing system of a compatible color-television receiver a new and improved control apparatus which has a reduced response to spurious transients developed as a result of mistuning of the receiver.

It is a further object of the invention to provide for use in an automatic color-synchronizing system of a compatible color-television receiver a new and improved control apparatus which is effective to cause that system to have a reduced response to spurious transients that are developed with relation to the trailing edge of the pedestals and the line-synchronizing pulses and/or the initial portions of the video-frequency information following those synchronizing pulses.

It is a further object of the invention to provide for use in an automatic color-synchronizing system of a compatible color-television receiver a new and improved control apparatus which is effective to accurately select during each synchronizing interval the same major portion of the color-burst interval, irrespective of transmitter signal tolerances.

In accordance with the present invention, a control apparatus for the color-synchronization system of a compatible color-television receiver comprises signal developing means responsive to at least the line-synchronizing pulses of the composite monochrome and the composite color-television signals for developing a periodic control signal therefrom. The control apparatus also includes gating means, subject to the application thereto of the aforesaid composite signals which may include spurious transients that are occasioned by receiver mistuning and/or the pass-band characteristic of the receiver and that may be related to the trailing edges of the line-synchronizing pulses and the pedestals of those composite signals, responsive to predetermined amplitude portions of the aforesaid control signal for translating restricted portions of the color-burst wave of the composite color-television signal, whereby the color-synchronization system is substantially unresponsive to the aforesaid spurious transients occurring during the trailing edge portions of the line-synchronizing pulses and the pedestals.

For a better understanding of the present invention, together with other and further objects thereof, reference is had to the following description taken in connection with the accompanying drawings, and its scope will be pointed out in the appended claims.

Referring to the drawings.

Figure 1:
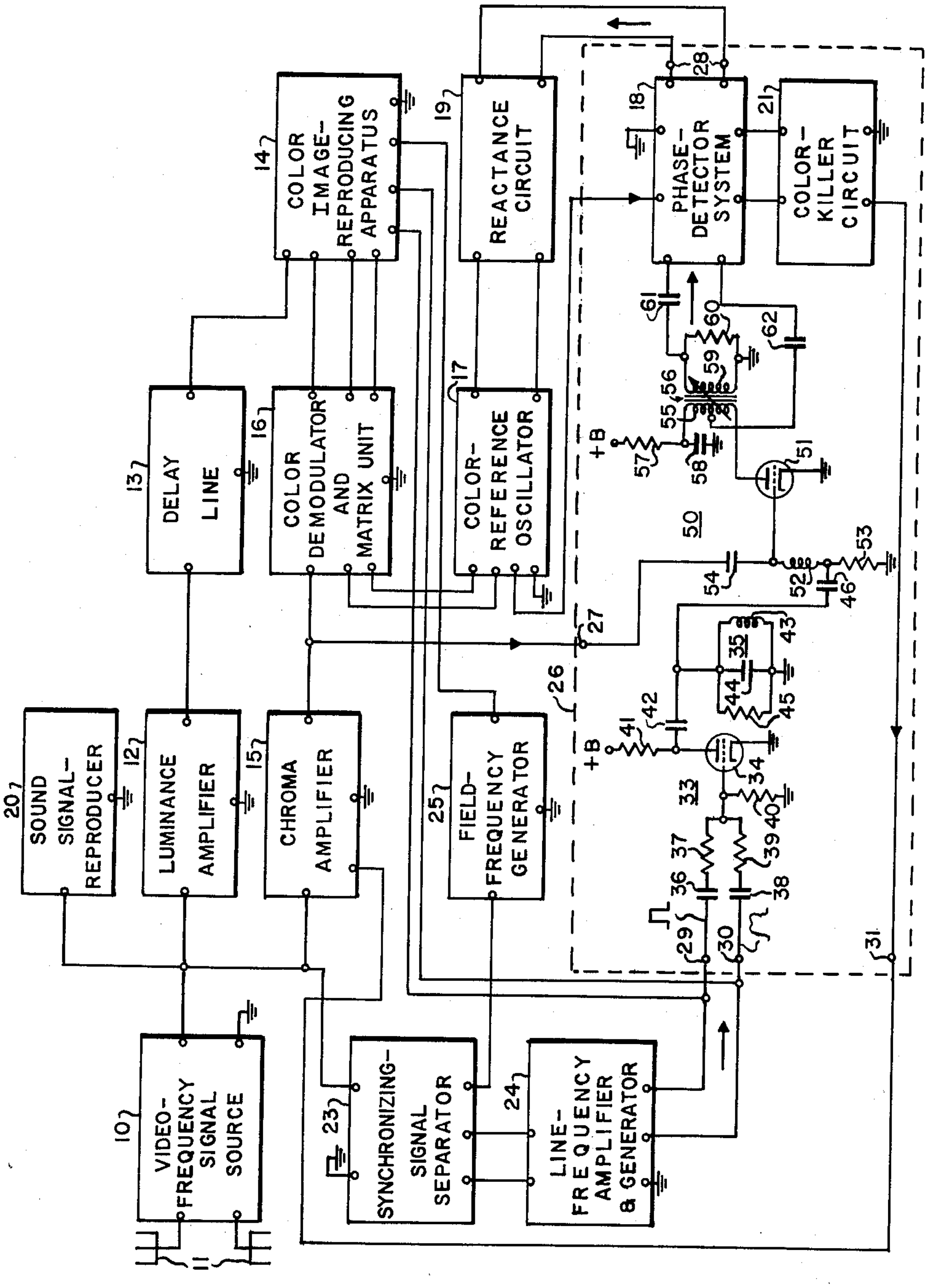
Fig. 1 is a circuit diagram, partly schematic, of a compatible color-television receiver including a control apparatus in accordance with the present invention.

*General description of color-television receiver of* Fig. 1

Referring now more particularly to Fig. 1 of the drawings, there is represented a color-television receiver of compatible type suitable for utilizing an NTSC type of color-television signal. Such a receiver includes a video-frequency signal source 10 which may, for example, comprise a radio-frequency amplifier having an input circuit coupled to an antenna 11, an oscillator-modulator, an intermediate-frequency amplifier, and a video-frequency signal detector. An output circuit of the source 10 is coupled through a luminance channel, specifically, through a luminance amplifier 12 and a delay line 13, in cascade, in the order named, to the output circuit of a color image-reproducing apparatus 14. The luminance amplifier may be of conventional construction having, for example, a pass band of approximately 0–3 megacycles. The delay line may be a conventional one for equating the time of travel of the signals through the units 12 and 13 with that of the chrominance signal through a chrominance channel to be described hereinafter. The color image-reproducing apparatus 14 may be of conventional construction for utilizing signals representative of luminance and chrominance, or components derived therefrom, to reproduce a color image.

The output circuit of the video-frequency signal source 10 is also coupled through a chrominance channel to input circuits of the apparatus 14. Such a channel may comprise, in cascade, in the order named, a chrominance amplifier 15 and a color demodulator and matrix unit 16. The chroma amplifier may be conventional, having a pass band of roughly 2.4–4.2 megacycles for translating the modulated subcarrier wave signal and its side bands. The color demodulator and matrix unit 16 may comprise conventional synchronous detectors for deriving color-difference signals from specific phases of the modulated subcarrier wave signal and a conventional matrix circuit for combining such signals to develop, for example, the color-difference signals $R-Y$, $B-Y$, and $G-Y$, representative respectively of the red, blue, and green components of a televised color image. A pair of output circuits of a 3.58 megacycle color-reference oscillator 17 are coupled to a pair of input circuits of the unit 16 for applying properly phased locally generated signals to the synchronous detectors in that unit to effect faithful derivation of desired modulation components of specific phases of the subcarrier wave signal.

The output circuit of the color-reference oscillator 17 is coupled to one input circuit of a phase-detector system 18 comprising one unit of a control system 26 constructed in accordance with the present invention and to be described more fully hereinafter. The phase-detector system 18 may be a balanced phase-detector system of the general type described in applicant's article entitled "The D.C. Quadricorrelator: A Two-Mode Synchronization System," appearing in the January 1954 issue of the Proceedings of the I.R.E., at pages 288–299, inclusive, or as described and claimed in applicant's copending application Serial No. 368,067, filed July 15, 1953, and entitled "Control Apparatus for Color-Television Receivers." The output circuit of the chroma amplifier 15 is connected to an input terminal 27 of the control system 26, which terminal is, in turn, coupled through circuits to be described hereinafter to an input circuit of the phase-detector system 18. An output circuit of the system 18 is coupled through a pair of output terminals 28, 28 and a reactance circuit 19 to an input circuit of the color-reference oscillator 17. Another output circuit of the phase-detector system 18 is coupled through a color-killer circuit 21, which is also described in applicant's above-identified article in the Proceedings of the I.R.E., and an output terminal 31 to a gain-control or input circuit of the chroma amplifier 15.

An output circuit of the video-frequency signal source 10 is also coupled through a synchronizing-signal separator 23 to the input circuits of a line-frequency amplifier and generator 24 and a field-frequency generator 25, output circuits of the two generators being coupled, respectively, to the horizontal and vertical deflection windings in the apparatus 14. One output circuit of unit 24 is connected to an input terminal 29 of unit 26 for supplying thereto amplified line-synchronizing pulses while another output circuit thereof, for example, a winding of the horizontal deflection transformer therein, is coupled to an input terminal 30 of unit 26.

The output circuit of the video-frequency signal source 10 is coupled to a sound-signal reproducer 20 which may include, for example, a sound-signal intermediate-frequency amplifier, a modulation signal detector, an audio-frequency amplifier, and a sound-signal reproducing device such as a loudspeaker. All of the units thus far described with the exception of portions of the control system 26, excluding the phase-detector system 18 and the color-killer circuit 21, may be of conventional construction which is well known in the color-television art and, therefore, a detailed description of these units is unnecessary herein.

*General explanation of operation of color-television receiver of Fig. 1*

For the purpose of a general explanation of the operation of the receiver, it will be assumed initially that the control system 26 is of conventional construction and hence operates in a well-known manner. In the video-frequency signal source 10, a conventional NTSC type of color-television signal is intercepted by the antenna 11, selected and amplified by the radio-frequency amplifier in that source, modified to an intermediate-frequency by means of an oscillator-modulator, further amplified by means of an intermediate-frequency amplifier, and the modulation components of the intermediate-frequency television signal are detected by means of a conventional detector. These modulation components comprise a composite color video signal and an intermediate-frequency sound signal. The composite video-frequency signal includes a luminance component, a chrominance component, and synchronizing components including line-frequency, field-frequency, and color-burst synchronizing signals. The luminance component is amplified in the unit 12, delayed in translation by the delay line 13, and applied to a control circuit of the color image-reproducing apparatus 14. The chrominance component, comprising a subcarrier wave signal modulated at specific phases by components representative of chrominance, is translated through the amplifier 15 and applied to an input circuit of the color demodulator matrix unit 16. In the latter, synchronous detectors derive the modulation components from specific phases of the subcarrier wave signal by means of a heterodyning of the applied subcarrier wave signal with properly phased signals developed in the color-reference oscillator 17. The derived components are combined in a matrix circuit in unit 16 to derive, for example, $R-Y$, $B-Y$, and $G-Y$ color-difference signals. These color-difference signals are applied to input circuits of the apparatus 14, wherein they individually combine with the luminance signal applied to the apparatus to develop, for example, the color signals R, G, and B representative, respectively, of the red, green, and blue components of a televised color image.

The line-frequency and field-frequency synchronizing components are separated from other components in separator 23 and are utilized to synchronize the operations of the line-frequency generator 24 and the field-frequency generator 25 with the operations of corresponding units at the transmitter. The line-frequency and field-frequency signals developed by the generators just mentioned are employed by the color image-reproducing apparatus 14 to effect the horizontal and vertical deflection of the electron beams therein to scan a raster on the image screen thereof. Such scanning operation combined with the intensity modulation of the electron beams in unit 14 by the three color signals results in a color reproduction of the televised image.

The color-burst synchronizing signal is translated through the amplifier 15 and applied to the input terminal 27 of the control system 26 for translation through suitable circuits to an input circuit of the phase-detector system 18. This phase-detector system is gated into operation during the interval of the burst signal as a result of the application to the input terminals 29 and 30 of the line-synchronizing pulses and the flyback pulses, respectively. The flyback pulses are used for impulse noise immunity during the intervals between line-synchronizing pulses. In the phase-detector system 18, the phases of the color-burst and locally generated signals are compared and any deviation of these signals from a specific phase relation, for example a quadrature-phase relation, results in the development of a control potential which is applied to the reactance circuit 19 to control the operation of the oscillator 17 to maintain such specific phase relationships. The signal developed in the phase-detector system 18 is also applied to the color-killer circuit 21 to control the operation thereof and develop one output signal when a burst is present and a different output signal when a burst is absent. Circuit 21 may be any conventional circuit arrangement which develops a suitable control potential to be applied to the gain-control circuit of the chroma amplifier 15 to render it nonconductive in the absence of the burst signal or when the oscillator 17 is not synchronized.

The intermediate frequency sound signal developed by the source 10 is applied to the sound-signal reproducer 20, wherein it is further amplified and the sound-signal components thereof are derived. The derived components are amplified in the audio-frequency amplifier thereof and are utilized by the sound-signal reproducing device to reproduce sound.

*Description of control apparatus of Fig. 1*

Referring now to Fig. 1, the control apparatus 26 for the color-synchronization system of the compatible color-television receiver comprises a signal developing means 33 including an electron-discharge device in the form of a triode electron tube 34 which is responsive to at least the line-synchronizing pulses of the composite monochrome and the composite color-television signals supplied to the input terminals 29 and 30 by the line-frequency amplifier and generator 24 and having an output circuit including a resonant circuit 35 which is shock-excited by the line-synchronizing pulses for developing a control signal which includes periodic control pulses occurring at the line-scanning rate. The input terminal 29 is connected to the control electrode of tube 34 through a coupling condenser 36 and a resistor 37. Flyback pulses are supplied by the line-frequency amplifier and generator 24 and may also be applied to the control electrode of tube 34 through terminal 30, coupling condenser 38, and a resistor 39. The cathode of tube 34 is connected directly to ground and its anode is connected to an energizing source indicated as, for example, +B through a resistor 41, while the control electrode is connected to ground through a grid-leak resistor 40. Circuit 35 is resonant at a suitable high frequency such as approximately thirteen times that of the line-scanning frequency. This resonant circuit includes an inductor 43 which is tuned by a condenser 44 connected in parallel therewith. A damping resistor 45 is connected across the tuned circuit 35. One terminal of the latter circuit may, if desired, be connected directly to ground while its other terminal is connected to the anode through a coupling condenser 42. The parameters of the circuit of tube 34 are such that the line-synchronizing pulses supplied to the terminal 29 are capable of rendering the tube conductive to the extent that it draws control electrode-cathode current capable of charging the condenser 36 so as to develop a negative bias for application to the control electrode of the tube adequate for maintaining the latter in a nonconductive condition during the intervals between the line-synchronizing pulses.

The control apparatus 26 further comprises a gating means 50 that is subject to the application thereto, by way of the terminal 27, of the composite monochrome and the composite color-television signals which may include spurious transients that are occasioned by receiver mistuning and/or the pass-band characteristic of the receiver and that may be related to the trailing edges of the line-synchronizing pulses and the pedestals of those signals. The gating means 50 includes an electron-discharge means which may be a triode electron tube 51 having a control electrode-cathode input circuit effective to render the tube conductive during intervals of predetermined amplitude portions of the control pulses developed in the output circuit of the signal developing means 33 and effective to draw control electrode-cathode current which develops in that input circuit a bias effectively maintaining the tube nonconductive during intervals between the predetermined amplitude portions of the control pulses. This input circuit includes the series combination of a coupling condenser 46 and a radio-frequency choke coil 52 which are connected between the ungrounded terminal of the resonant circuit 35 and the control electrode of tube 51, and further includes the grounded cathode of the tube and a resistor 53 having one terminal connected to the junction of the choke coil 52 and its other terminal connected to ground. The parameters of this input circuit are such that the application of a control signal thereto from the tuned circuit 35 causes the tube 51 to draw control electrode-cathode current and charge the condenser 46 to a negative potential which is effective to maintain the tube 51 normally nonconductive. The terminal 27, supplying the composite color-television signals, is coupled to the control electrode of unit 51 by the condenser 54.

The anode of tube 51 is connected to a source of potential +B through a primary winding 55 of a transformer 56 and a load resistor 57, one terminal of the latter being connected to ground through by-pass condenser 58. A tap on the winding 55 is connected to an input circuit of phase-detector system 18 through a coupling condenser 62. The secondary winding 59 of transformer 56 is connected to another input terminal of the phase-detector system 18 through a coupling condenser 61. A damping resistor 60 is connected in parallel with winding 59.

*Explanation of operation of control apparatus of Fig. 1*

Figure 2:
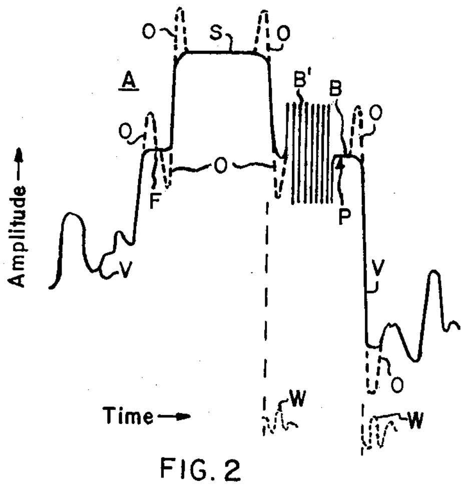
Fig. 2 is a graph utilized in explaining the operation of the control apparatus of Fig. 1.

Considering the operation of the control apparatus of Fig. 1, reference is made to Fig. 2 which represents in a greatly enlarged time scale a fragmentary portion of a composite color-television signal which includes video-frequency information V, a pedestal region P comprising a so-called front porch F and the back porch B, the latter containing about eight cycles of the high-frequency color-burst signal B′, and a single synchronizing pulse S superimposed on the pedestal P. For reasons mentioned in the introductory portion of the specification, the composite signal represented may contain a number of overshoots O, represented in broken-line construction, adjacent the trailing and leading edge portions of the pedestal P, the synchronizing pulses S, and the initial portion of the video-frequency portion V extending into the white area at the terminal portion of the pedestal. As previously stated, these overshoots and undershoots constitute transient signals which may undesirably actuate the color-synchronization circuits of the receiver and upset the proper operation of the receiver. These transients may ring circuits in the receiver and produce damped oscillations termed widgets such as those represented by the broken-line waves W below the trailing edge of the line-synchronizing pulses S and the trailing edges of the pedestal P. These widgets represent undesired high-frequency information, and it will be seen that they resemble the high-frequency burst signal B′. Applicant's control apparatus is effective to avoid the undesired effects of these widgets which upset the proper operation of the receiver.

Figure 3:
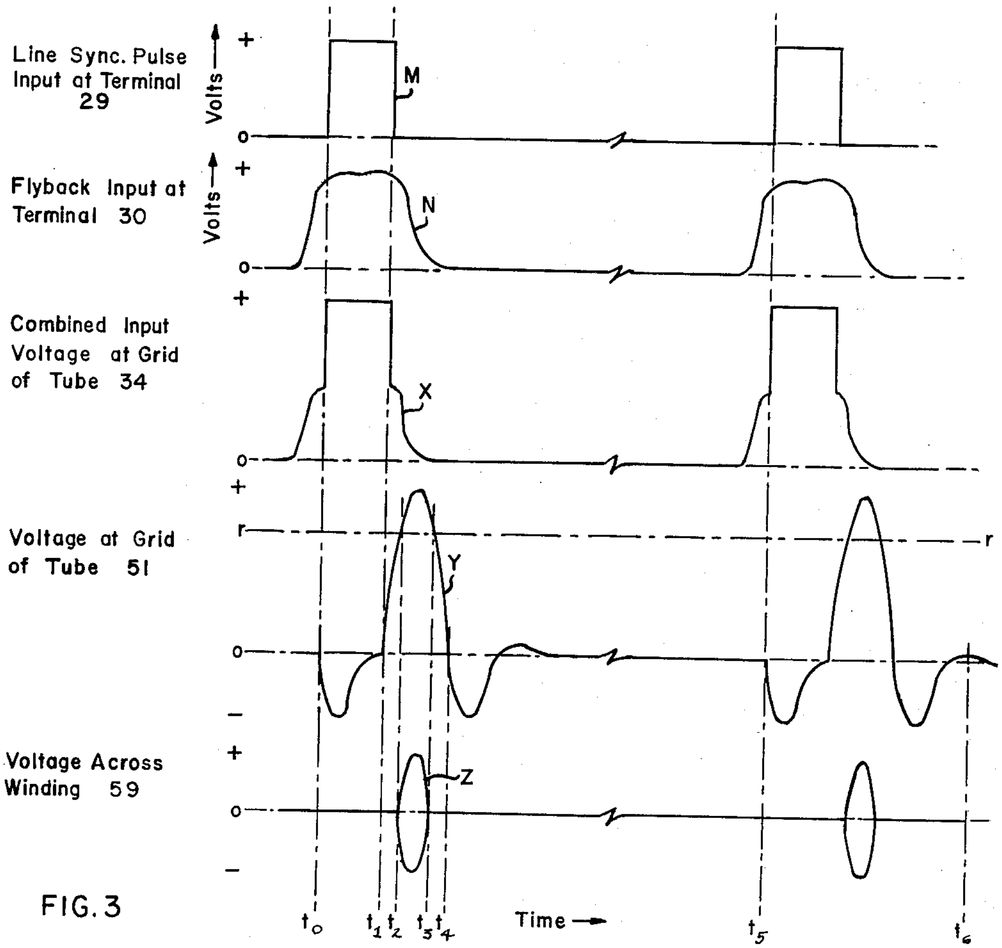
Fig. 3 is another graph employed for the purpose just mentioned.

Referring now to Fig. 3 of the drawings, there is represented to a reduced time scale in relation to that of Fig. 2 various pulses which are developed in the control apparatus 26. Curve M represents a pair of line-synchronizing pulses which are applied to the input terminal 29, while curve N represents a pair of flyback pulses which are applied to terminal 30. The composite signal applied to the control electrode of tube 34, comprising proportionate amounts of curves M and N, has a wave form represented by curve X. At time $t_0$ current begins to flow in tube 34 causing the voltage at the anode to decrease because of the current flow through the network in the plate circuit. The voltage appearing at the ungrounded terminal of the resonant circuit 35 exhibits the first negative transition represented in curve Y. The transient dies out before $t_1$ because of the increasing damping effect added to the resonant circuit 35 due to the plate resistance of tube 34. At time $t_1$, the input voltage represented by the pulse of curve X decreases abruptly and the resonant circuit 35 is shock-excited. The shock excitation of the ringing circuit produces an oscillation which is damped out by the action of resistor 45 in approximately two half cycles as indicated in curve Y. The leading edge of the large amplitude, positive-going pulse portion of curve Y during the interval $t_1$–$t_4$ is timed by the trailing edge of the pulse of curve M. The parameters of the signal developing means 33 may be selected accurately to establish this large amplitude, positive-going pulse so as to overcome the bias developed by preceding such pulses at the control electrode of tube 51 of the gating means 50. When the threshold level $r$—$r$ represented by the dash-dot line of curve Y is exceeded by the pulse applied to the control electrode of tube 51, the latter is rendered momentarily conductive during the interval $t_2$–$t_3$. The portion of the color-burst signal which is represented by curve Z of Fig. 3 occurs during the interval $t_2$–$t_3$ (depending on transmitted tolerance), and this burst signal comprises at least part of the eight or more transmitted cycles of oscillation occurring at a frequency of 3.58 megacycles. The burst signal is applied as a portion of the composite color-television signal from the chroma amplifier 15 to terminal 27 of the control apparatus 26 which, in turn, translates that signal through the condenser 54 to the control electrode of the tube 51. The difficulty with widgets mentioned above many be avoided by permitting the tube 51 to translate only the color-burst signal or a portion thereof such as the intermediate and terminal portions thereof while maintaining the tube insensitive to other information appearing on either side of the color-burst pulses. This is accomplished by the accurate timing of $t_1$–$t_4$. The burst pulse such as that represented as the first burst pulse of curve Z may be developed across the winding 59 of transformer 56 for application through the condenser 61 to one input circuit of the phase-detector winding. A similar radio-frequency pulse but having a different phase relation may be applied through the condenser 62 to another input circuit of the phase-detector system. These color-burst pulses may be used to control the operation of units 18 and 21 in the general manner explained in applicant's above-identified article and copending application.

Succeeding pulses of the curves represented in Fig. 3 similarly act upon and control the circuits of unit 26 during the intervals $t_5$–$t_6$ and following, and hence the explanation need not be repeated for those pulses.

Control apparatus heretofore employed for controlling the color-synchronization circuit of color-television receivers did not provide accurate gating of a gated tube, such as the tube 51, which translated the color-burst information to the phase-detector system. The control apparatus described above, in addition to providing an extremely narrow and accurately established gating pulse, may be proportioned to accomplish restrictive burst gating by removing the initial and/or the terminal portions of a color-burst wave. This will permit the elimination of troublesome widgets associated with either the trailing edge of the line-synchronizing pulses or the trailing edge of the pedestals when the latter change abruptly as when an extremely white portion of an image is being scanned.

In addition, since the interval $t_2$–$t_3$ is always in the same time position relative to the trailing edge of the pulse M, the portion of the gated color-burst signal is always accurately positioned for every cycle of line scan. During the operation of the receiver, the latter may temporarily fail to apply line-synchronizing pulses to the terminal 29. The application of flyback pulses to the terminal 30 is effective to maintain a sufficiently high negative bias on the control electrodes of tube 34 so that it remains normally nonconductive. In the absence of both line-synchronizing and flyback pulses for application to the control electrodes of tube 34, the latter would draw a large space current which might damage the tube. Except for the need for the flyback pulses for the purpose mentioned above, the signal developing means 33 proper could be operated from synchronizing pulses applied to the terminal 29. However, the flyback pulses also supply impulse noise immunity during the interval between synchronizing pulses M, and comprise a desirable part of this circuit.

While applicant does not wish to be limited to any particular values of circuit constants, the folllowing have proved to be useful in the circuit of Fig. 1:

| | |
|---|---|
| Condensers **36** and **38** | 0.01 microfarad. |
| Condenser **42** | 1000 micromicrofarads. |
| Condenser **46** | 390 micromicrofarads. |
| Condenser **54** | 180 micromicrofarads. |
| Condenser **58** | 220 micromicrofarads. |
| Condenser **61** | 1000 micromicrofarads. |
| Condenser **62** | 2000 micromicrofarads. |
| Resistor **37** | 15 kilohms. |
| Resistor **39** | 220 kilohms. |
| Resistor **40** | 1 megohm. |
| Resistor **41** | 15 kilohms. |
| Resistor **45** | 27 kilohms. |
| Resistor **53** | 470 kilohms. |
| Resistor **57** | 220 ohms. |
| Resistor **60** | 10 kilohms. |
| Inductor **43** | 8 millihenries. |
| Resonant frequency circuit **35** | 200–250 kilocycles. |
| Tubes **34** and **51** | Type 6BA8A. |
| +B | 300 volts. |
| Amplitude of line-synchronizing pulses applied to terminal **29** | 35 volts. |
| Amplitude of flyback pulses applied to terminal **30** | About 170 volts. |

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Control apparatus for the color-synchronization system of a compatible color-television receiver comprising: signal developing means responsive to at least the line-synchronizing pulses of the composite monochrome and the composite color-television signals for developing a periodic control signal therefrom; and gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control signal for translating restricted portions of the color-burst wave of said composite color-television signal, whereby the color-synchronization system is substantially unresponsive to said spurious transients occurring during the trailing edge portions of said line-synchronizing pulses and said pedestals.

2. Control apparatus for the color-synchronization system of a compatible color-television receiver comprising: signal developing means responsive to at least the line-synchronizing pulses of the composite monochrome and the composite color-television signals for developing a periodic control signal which includes pulses that are delayed with relation to their corresponding line-synchronizing pulses; and gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

3. Control apparatus for the color-synchronization system of a compatible color-television receiver comprising: signal developing means including an input circuit responsive to the flyback pulses of the receiver and the line-synchronizing pulses of the composite monochrome and the composite color-television signals and including an output circuit for developing therein a periodic control signal therefrom; and gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

4. Control apparatus for the color-synchronization system of a compatible color-television receiver comprising: signal developing means including a shock-excited circuit responsive to at least the line-synchronizing pulses of the composite monochrome and the composite color-television signals for developing a periodic control signal therefrom; and gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control signal for translating restricted portions of the color-burst wave of said composite color-television signal, whereby the color-synchronization system is substantially unresponsive to said spurious transients occurring during the trailing edge portions of said line-synchronizing pulses and said pedestals.

5. Control apparatus for the color-synchronization system of a compatible color-television receiver comprising: signal developing means including a resonant circuit responsive to at least the trailing edges of the line-synchronizing pulses of the composite monochrome and the composite color-television signals for developing periodic control pulses therefrom; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

6. Control apparatus for the color-synchronization system of a compatible color-television receiver comprising: signal developing means including an electron-discharge device having an input circuit responsive to at least the line-synchronizing pulses of the composite monochrome and the composite color-television signals and having an output circuit including a resonant circuit shock-excited by the trailing edges of said synchronizing pulses for developing in said output circuit periodic control pulses therefrom; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

7. Control apparatus for the color-synchronization system of a compatible color-television receiver comprising: signal developing means including an electron-discharge device having an output circuit and having an input circuit responsive to at least the line-synchronizing pulses of the composite monochrome and the composite color-television signals for rendering said device conductive during the pulse intervals and developing in said input circuit a bias effectively maintaining said device nonconductive during the intervals between said pulses and for developing in said output circuit a periodic control signal; and gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

8. Control apparatus for the color-synchronization system of a compatible color-television receiver comprising: signal developing means including an electron-discharge device having an output circuit and having a control electrode-cathode input circuit responsive to the flyback pulses of the receiver and the line-synchronizing pulses of the composite monochrome and the composite color-television signals for rendering said device conductive during the pulse intervals and drawing control electrode-cathode current which develops in said input circuit a bias effectively maintaining said device nonconductive during the intervals between said pulses and for developing in said output circuit periodic control pulses that are delayed with relation to their corresponding line-synchronizing pulses; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

9. Control apparatus for the color-synchronization system of a compatible color-television receiver comprising: signal developing means including an electron-discharge device having a tuned output circuit resonant at a frequency about thirteen times that of the line-synchronizing pulses and having a control electrode-cathode input circuit responsive to the flyback pulses of the receiver and the line-synchronizing pulses of the composite monochrome and the composite color-television signals for rendering said device conductive during the pulse intervals and drawing control electrode-cathode current which develops in said input circuit a bias effectively maintaining said device nonconductive during the intervals between said pulses and for shock-exciting said output circuit and developing therein periodic control pulses that are delayed with relation to their corresponding line-synchronizing pulses; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

10. Control apparatus for the color-synchronization system of a compatible color-television receiver comprising: signal developing means responsive to at least the line-synchronizing pulses of the composite monochrome and the composite color-television signals for developing periodic control pulses therefrom; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals including an electron-discharge means having an output circuit and having a control electrode-cathode input circuit responsive to predetermined amplitude portions of said control pulses for rendering said device conductive during the intervals of said predetermined amplitude portions and drawing control electrode-cathode current which develops in said input circuit a bias effectively maintaining said device nonconductive during intervals between said predetermined amplitude portions and for translating only the intermediate and terminal portions of the color-burst wave of said composite color-television signal, whereby the color-synchronization system is substantially unresponsive to said spurious transients occurring during the trailing edge portions of said line-synchronizing pulses and said pedestals.

11. Control apparatus for the color-synchronization system of a compatible color-television receiver comprising: switching means effectively responsive only to the coincident application thereto of the flyback pulses of the receiver and the line-synchronizing pulses of the composite monochrome and the composite color-television signals for deriving relatively noise-free synchronizing pulses; signal developing means responsive to the relatively noise-free line-synchronizing pulses for developing periodic control pulses therefrom; and gating means, subject to the application thereto of said signals which may include spurious transients that are occasioned by receiver mistuning and/or the pass-band characteristic of the receiver and that may be related to the trailing edges of said line-synchronizing pulses and the pedestals of said signals, responsive to predetermined amplitude portions of said control pulses for translating restricted portions of the color-burst wave of said composite color-television signal, whereby the color-synchronization system is substantially unresponsive to said spurious transients occurring during the trailing edge portions of said line-synchronizing pulses and said pedestals.

12. Control apparatus for a compatible color-television receiver comprising: signal developing means responsive to at least the line-synchronizing pulses of the composite monochrome and the composite color-television signals for developing a periodic control signal therefrom; gating means, subject to the application thereto of said composite signals which may include spurious transients that are occasioned by receiver mistuning and/or the pass-band characteristic of the receiver and that may be related to the trailing edges of said line-synchronizing pulses and the pedestals of said composite signals, responsive to predetermined amplitude portions of said control signals for translating restricted portions of the color-burst wave of said composite color-television signal; and a color-synchronization system for utilizing said restricted portions, whereby said system is substantially unresponsive to said spurious transients occurring during the trailing edge portions of said line-synchronizing pulses and said pedestals.

References Cited in the file of this patent

UNITED STATES PATENTS

| | | |
|---|---|---|
| 2,586,957 | Keizer | Feb. 26, 1952 |
| 2,666,136 | Carpenter | Jan. 12, 1954 |
| 2,726,282 | Bigelow | Dec. 6, 1955 |
| 2,830,115 | Kelly | Apr. 18, 1958 |